2 Sheets—Sheet 1.
W. F. KISTLER.
Flour Sifter, Scoop and Strainer.
No. 205,560. Patented July 2, 1878.
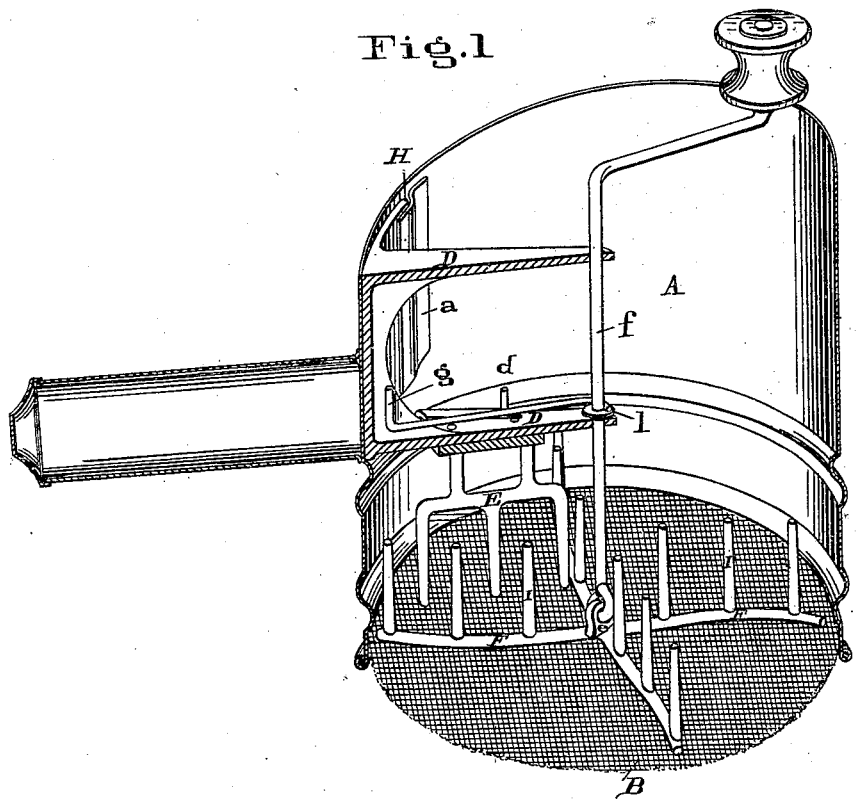

2 Sheets—Sheet 2.
W. F. KISTLER.
Flour Sifter, Scoop and Strainer.
No. 205,560. Patented July 2, 1878.
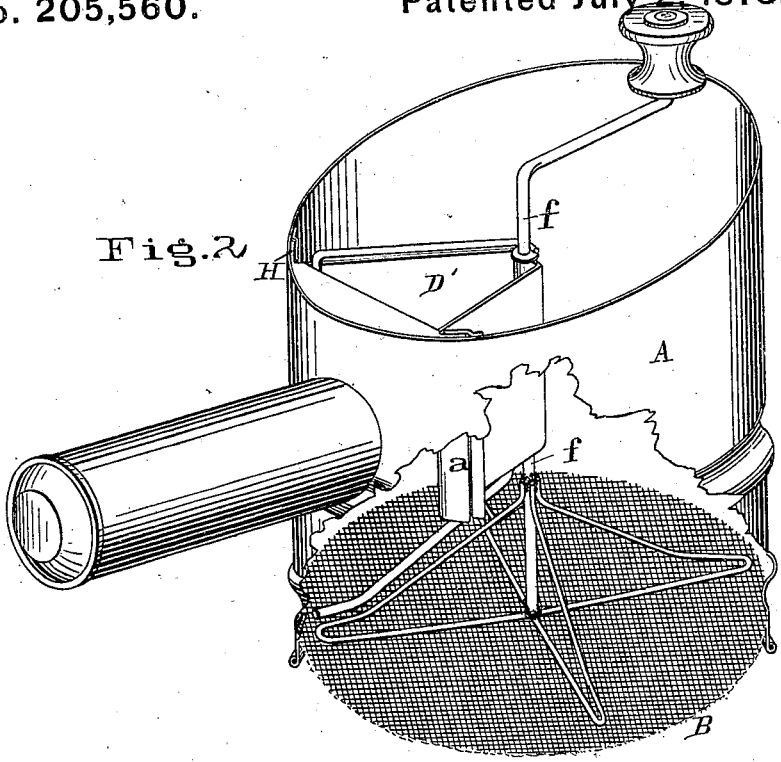
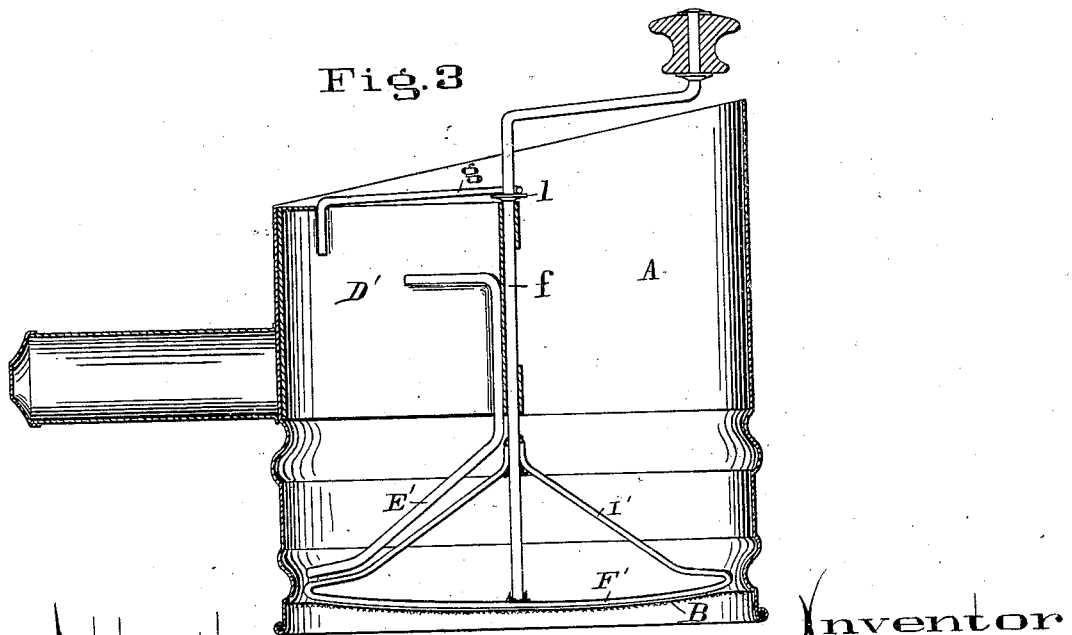
Attest
Chas. F. Gefsert
Chas. Beisse
Inventor
Willoughby F. Kistler
By Geo. J. Murray
his Atty

UNITED STATES PATENT OFFICE.

WILLOUGHBAY F. KISTLER, OF CINCINNATI, OHIO.

IMPROVEMENT IN FLOUR SIFTER, SCOOP, AND STRAINER.

Specification forming part of Letters Patent No. 205,560, dated July 2, 1878; application filed May 14, 1878.

*To all whom it may concern:*

Be it known that I, WILLOUGHBAY F. KIST-LER, of Cincinnati, in the county of Hamilton and State of Ohio, have invented a new and useful Improvement in Flour Sifter, Scoop, and Strainer, of which the following is a specification:

This invention relates to that class of flour and meal sifters which consist of a scoop-shaped tube provided with a handle, with which it is held by the left hand, while the right hand operates a rotary agitator to facilitate the operation of sifting.

The object of the invention is to provide a means to prevent the formation of lumps in the flour or other substance to be passed through the sieve, and to break any lumps that may be in the flour, meal, or other substance.

In the accompanying drawing, Figure 1 is a perspective sectional view of the preferred form of my invention. In this form the agitator, its bearings, and breakers are constructed of cast metal. Fig. 2 is a perspective view, partly in broken section; and Fig. 3, a central vertical section of my improvement when the agitator and its connections are constructed of tin and wire.

A is a cylinder, fitted with a flat sieve at the bottom, and having the top end inclined, scoop-shaped, upward from the handle side to the opposite side. Secured to the inside of the cylinder A are lugs $a$, at a proper distance to receive and firmly hold the brackets D, which support the stationary breaker E, the agitator F, its operating crank and shaft $f$, and retaining-spring $g$, by means of segmental flanges H, which form part of said brackets, and projecting from the sides thereof, concentric with the cylinder, enter the grooves formed by the projecting flanges of the lugs $a$. A depression or molding formed in the cylinder serves as a rest for the bracket, to retain or stop it in the proper vertical position.

The arms of the agitator F are curved in the direction of rotation, so as to evenly distribute the flour over the surface of the sieve B by overcoming the tendency to throw it to the outer circumference, as would be the case if the arms were straight or curved in the opposite direction. Teeth or pins I project up from the arms at intervals, to pass between spaces formed by corresponding teeth of the stationary breaker E, which project down from the bracket D.

The crank-shaft $f$ has its bearings in the ends of brackets D. A collar, $l$, secured upon it above the lower bracket D, prevents the agitator from rubbing too hard upon the sieve, while the spring $g$, which is secured at one end in the bracket, has its free end pressing upon the collar, to keep the agitator down with the requisite pressure upon the sieve. The shaft $f$ is jointed to the agitator by having its lower end looped through a lug, $e$, so as to form a universal joint, to permit the agitator to adjust itself to any inequalities in the sieve.

The supporting-brackets D, agitator F, and breaker E may each be cast in one piece, and require but little fitting to adapt for use. The crank-shaft $f$ is of wire, and the collar $l$ is the ordinary washer.

It will be seen the parts are cheaply constructed, and require but little fitting.

In the modification shown in Figs. 2 and 3, the supporting-brackets and their retaining-flanges are constructed of tin. The shaft-bearings are straps of tin, soldered to the apex of the triangular bracket. The spring which keeps the agitator down is the same in construction as in Fig. 1, and is, like the wire breaker E', soldered to the bracket D'. The agitator is made of wire, bent to the shape shown in Figs. 2 and 3, and is secured, by soldering or other suitable means, to the crank-shaft. Of course the breaker and agitator in these figures may be constructed of wire, of the same shape as shown in Fig. 1; but this construction, when wire only is used, is deemed preferable.

To use my sifter, the bracket and its connections are withdrawn, a sufficient quantity of flour or meal scooped, and the parts returned, as seen in the drawings. The vessel is now held in the left hand, while with the right the crank-shaft is revolved.

After it has been used, the parts may be easily removed for cleaning, as they may be at any time when it is desired to use the utensil as a strainer, by simply lifting the bracket D vertically until its flanges are disengaged from the lugs *a*.

I claim—

The combination, in a flour-sifter, of agitator F, armed with teeth I, with a stationary breaker, E, substantially as and for the purpose specified.

WILLOUGHBAY F. KISTLER.

Witnesses:
 EUGENE W. LIPPERT,
 GEO. J. MURRAY.